Patented May 8, 1928.

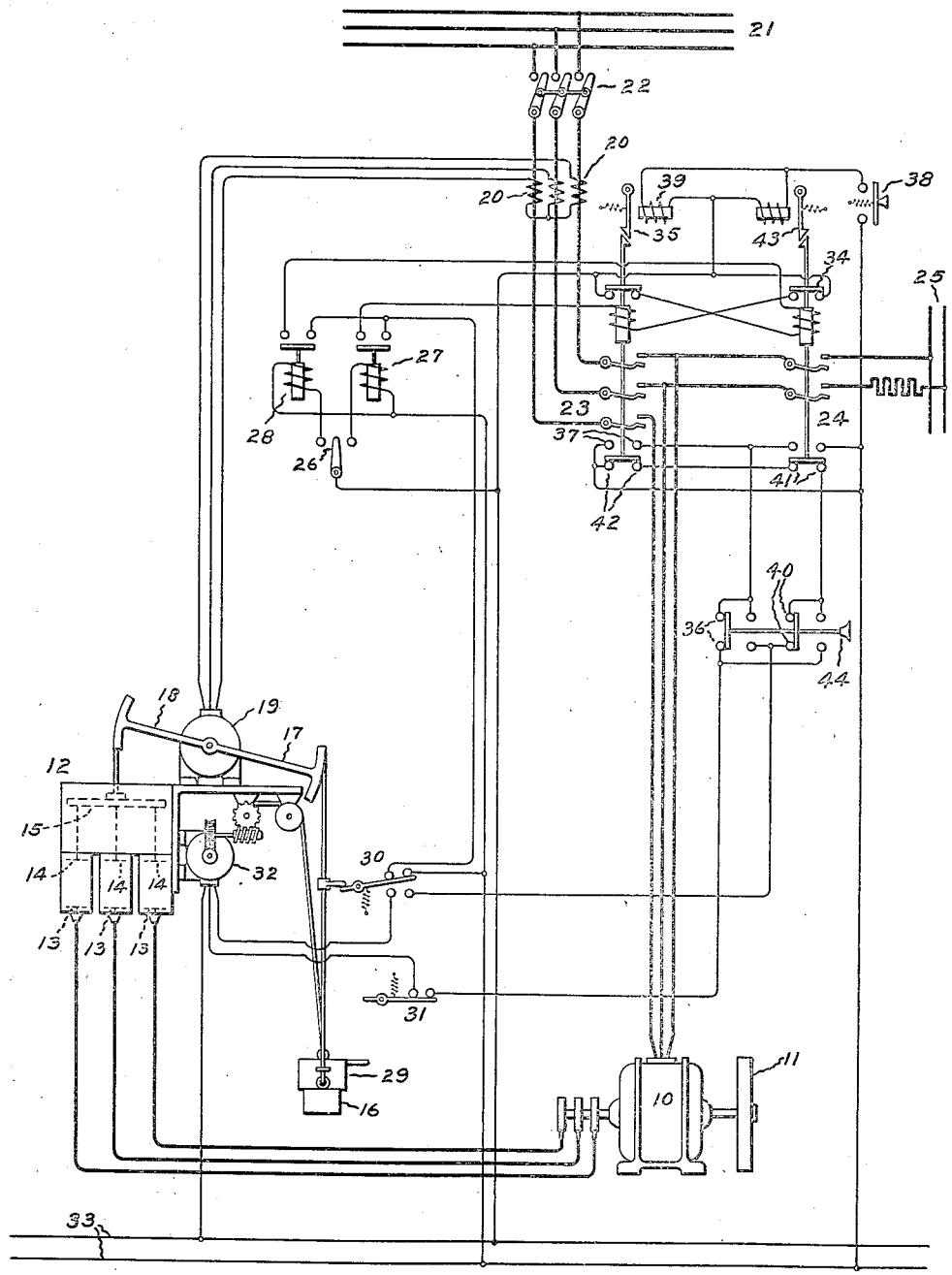

1,669,132

UNITED STATES PATENT OFFICE.

GEORGE H. JUMP, OF BUFFALO, NEW YORK, ASSIGNOR TO GENERAL ELECTRIC COMPANY, A CORPORATION OF NEW YORK.

SLIP-REGULATOR CONTROL.

Application filed June 21, 1926. Serial No. 117,232.

My invention relates to the control of liquid slip regulators, which are commonly provided for automatically regulating the slip of an alternating current motor so as to permit a fly-wheel or other inertia device connected with the motor to assist in carrying peak loads thrown on the motor.

Liquid slip regulators are commonly provided with electrodes, the position of which may be varied in order to vary the resistance of the regulator and thus control the slip of the motor controlled. The weight of hese electrodes is ordinarily counterbalanced in such a way that the electrodes have a small tendency or bias to assume the minimum resistance position. An electroresponsive device, such as a torque motor, is automatically provided for varying the position of the regulator electrodes and this device is customarily energized in accordance with the load on the motor, the slip of which is to be controlled. The torque motor or other electroresponsive device operates to raise the electrodes and thus automatically control the resistance of the regulator in accordance with the load on the main motor. With such an arrangement, when the main motor is connected to its source of supply, the torque motor will be energized by the rush of current taken by the main motor so as to operate the electrodes to the maximum resistance position, but by reason of the fact that the electrodes are initially in the minimum resistance position, the current taken by the motor when it is initially connected to its source of supply will be excessive and the strains on the various parts will be abnormal.

One of the objects of my invention is to insure that the main motor will not be initially connected to its source of supply unless the regulator electrodes are in their high resistance position so that when the motor is connected to its source of supply the current taken by the motor will be within reasonable limits, and the acceleration of the motor will be smoothly accomplished.

Alternating current induction motors are sometimes stopped either by reversing the connections of the motor to a source of supply, or by disconnecting the motor from the alternating current supply and connecting the field windings thereof to a direct current source of supply. In each case, the motor acts as a braking generator to quickly retard the load. When the motor is thus used as a braking generator, it is desirable that the regulator electrodes be in a high resistance position in order that the braking torque of the motor may be limited to reasonable values.

A further object of the invention is to insure that the regulator electrodes will be in a high resistance position before the braking connections of the motor are established. A still further object of the invention is to effect the control of the slip regulator by automatic means which function without any attention on the part of the operator to insure that the regulator electrodes will be in a desired position for taking care of the conditions encountered.

In carrying my invention into effect in the form which I now regard as the preferred form thereof, an auxiliary counterweight is provided for the electrodes of the regulator and this auxiliary counterweight is automatically operated by an auxiliary motor which is controlled automatically in response to the operation of switch mechanism provided for connecting the motor to an alternating current source of supply and for establishing the braking connections for the motor. The auxiliary motor is interconnected with said switch mechanism in such a manner that the switch mechanism cannot be closed unless the regulator electrodes are in a high resistance position. In this manner, the functioning of the slip regulator is entirely automatic and no special precautions need be taken by the operator since an incorrect operation is prevented by the improved system.

For a better understanding of the invention, reference is had to the accompanying drawing in which I have shown in very diagrammatic form, an embodiment of the invention for the purpose of explaining the principles thereof. The main electric motor 10 is indicated as of the three-phase wound rotor type, and is provided for the purpose of driving a load (not shown). The flywheel 11 is connected with the motor 10 so as to assist the motor in taking care of peak load conditions. The liquid slip regulator 12 is connected in the rotor circuit of the motor for the customary purpose of increasing the resistance in the slip ring circuit of the motor when the current input to the stator of the motor exceeds a predetermined amount so as to thereby limit the torque output of the induction motor and permit the flywheel to give up some of its stored energy. The kinetic energy of the flywheel is given up by an increase in the slip of the induction motor to an extent dependent on the mechanical power demand at the motor shaft in excess of the torque delivered by the motor itself.

The regulator is provided with stationary electrodes 13 and cooperating movable electrodes 14. The weight of the movable electrodes, the supporting member 15 therefor and the weight of the other moving parts of the regulator are partially counterbalanced by a counterbalancing weight 16 which is connected with the right hand arm of the lever 17, the left hand arm 18 of which is connected to the movable electrodes of the regulator. The counterbalance 16 is of such a value that the electrodes 14 have a slight bias or tendency to move to the minimum resistance position. The movable electrodes are varied in position in response to the load on the motor 10 by means of a torque motor 19 of the three-phase alternating current type energized from the secondaries of the current transformers 20 having their primaries included in the stator circuit of the motor 10.

The motor 10 is connected to its source of supply 21 (after the disconnecting switch 22 is closed) by means of the electromagnetic switch or contactor 23. The contactor 24 is provided for connecting the motor with the direct current supply circuit 25 so as to establish braking relations for the motor. The contactors 23 and 24 are suitably electrically interconnected in the customary manner to prevent simultaneous closure thereof. The contactors 23 and 24 are energized under the control of a master switch 26 operating through the electromagnetic relays 27 and 28, the relay 27 being provided for energizing the line contactor 23 and the relay 28 being provided for energizing the brake contactor 24.

In order to insure that the regulator electrodes 14 will be in their maximum resistance position when the motor is either initially connected to the source of supply 21 or connected to the source of supply 25 for braking, I have provided the auxiliary counterweight 29 which cooperates with the counterweight 16 to bias the electrodes 14 to the position shown in the drawing. The limit switches 30 and 31 cooperate with the counterbalances 29 and 16 so as to insure that the regulator electrodes will be in the desired position at the proper time. The auxiliary counterweight 29 is raised and lowered with respect to counterweight 16 by means of the auxiliary motor 32 which is controlled by limit switches 30 and 31 and by auxiliary switch mechanism connected with the contactors 23 and 24 for the objects stated.

As thus constructed and arranged and with the parts in their respective positions indicated in the drawing the operation of my invention is as follows:

The disconnecting switch 22 will first be closed and the master switch 26 will be moved to make engagement with its right hand terminal, thereby energizing the "run" relay 27 through a circuit from the direct current supply circuit 33. The line contactor 23 will thereby be energized through a circuit from the lower conductor of the source of supply 33, upper contacts associated with limit switch 30, contacts of relay 27, winding of line contactor 23, upper auxiliary switch 34 associated with brake contactor 24 to the upper conductor of a supply circuit 33. By reason of the fact that the movable electrodes are in their upper or high resistance position, this energization of the line contactor 23 is permitted. When the line contactor closes it is mechanically held in the closed position, independently of control by the master switch 26, by means of the electromagnetic detent 35.

Upon the closing of the line contactor 23, the auxiliary motor 32 of the regulator is energized through a circuit from the upper conductor of the supply circuit 33, limit switch 31, manual switch contact 36, auxiliary switch contacts 37 associated with line contactor 23 to the lower conductor of the source 33. The auxiliary counterbalance 29 will now be raised by the auxiliary motor 32 and the electrodes thus placed under the control of the torque motor 19. When the the counterbalance 29 has been raised to a predetermined height, the auxiliary switch 31 will be opened and the motor 32 deenergized. By reason of the worm gear drive between motor 32 and the counterbalance 29, the counterbalance will be maintained in this elevated position independently of the interruption of the supply of current to the motor 32. When the electrodes 14 are lowered a predetermined amount under the control of the torque motor 19, the limit switch 30 will be released to move in accordance with its bias and make engagement with its lower set of contacts. However, with the motor 10 connected to the source of supply 21, this will produce no effect at this time.

In order to disconnect the motor 10 from the supply circuit 21, the push button 38 is closed and the release electromagnet 39 is energized to release the catch 35. When the line contactor 23 opens (it has been assumed that the master switch 26 has been returned to the neutral position shown) the auxiliary motor 32 of the regulator will be automatically energized to lower the auxiliary counterbalance 29 and thus cause the regulator electrodes to be raised to their positions shown in the drawing. The auxiliary motor 32 will be energized through the lower contacts of limit switch 30, manual switch contacts 40, lower auxiliary switch contacts 41 associated with brake contactor 24 and lower contacts of the auxiliary switch associated with line contactor 23 to the lower conductor of supply circuit 33. Until the electrodes have been raised to their positions shown in the drawing and the limit switch 30 has been operated to interrupt the circuit through the lower set of contacts and close the circuit through its upper set of contacts neither contactor 23 nor contactor 24 can be energized to close. This is to insure that the motor 10 can neither be connected to its supply circuit 21 for normal running nor to supply circuit 25 for braking unless the regulator electrodes are in a high resistance position.

Under certain circumstances, it may be desirable for the operator to place the master switch 26 in contact with its left hand contact after the energization and closing of the line contactor 23 so that when the push button 38 is operated to disconnect the motor 10 from the supply 21, the braking connections for the motor will be automatically established as soon as the regulator contacts are in their high resistance position. The brake contactor 24 is also provided with an electromagnetically controlled retaining catch 43 so as to hold the brake contactor closed independently of the master switch 26. After the brake contactor 24 is closed, the auxiliary motor 32 will be energized to raise the auxiliary counterbalance 29 and thus permit the electrodes 14 to gradually assume their minimum resistance position. If at any time during the operation of the equipment with the motor connected to the supply circuit 21, it is desired that the electrodes 14 be varied from the position in which these electrodes are held by the torque motor 19, the operator may effect such control through manually operated switch 44. The interconnections of this push button switch 44 with the line contactor 23 and the brake contactor 24 are such that the auxiliary motor 32 may be at any time energized to lower the counterbalance 29 and thus raise the electrodes 14 by operating the switch 44 into engagement with its right hand side of contacts.

What I claim as new and desire to secure by Letters Patent of the United States, is,—

1. In combination, a driving motor, a liquid slip regulator therefor having movable electrodes for varying the effective resistance of the regulator, means operated responsively to the load on said motor for automatically varying the position of said electrodes, switch mechanism for connecting said motor to a source of supply, and means automatically controlled by said switch mechanism for governing said electrodes independently of said first mentioned means to insure that said electrodes will be in a high resistance position when said motor is initially connected to the source of supply.

2. In combination, a driving motor, a liquid slip regulator therefor having movable electrodes for varying the resistance of the regulator, a counterweight for said electrodes, means operated responsively to the load on the motor for automatically varying the position of said electrodes, switch mechanism for connecting said motor to a source of supply, and means governed by said switch mechanism for supplementing said counterweight to necessitate that said electrodes be in a high resistance position before the said switch mechanism is operative to connect the motor to the source of supply.

3. In combination, a liquid slip regulator having movable electrodes for varying the effective resistance of the regulator, the said electrodes being normally biased to a low resistance position, a torque motor for automatically varying the position of said electrodes in accordance with predetermined conditions, a counterweight for said electrodes, and means for automatically governing the said counterweight to insure that said electrodes will be in a high resistance position under predetermined conditions independently of said torque motor.

4. In combination, a driving motor, a liquid slip regulator therefor having movable electrodes for varying the effective resistance of the regulator, a counterweight for said electrodes whereby the electrodes have a slight bias to move to a low resistance position, means responsive to the load on said motor for automatically varying the position of said electrodes, switch mechanism for controlling the energization of said motor, an auxiliary counterweight for said electrodes, an auxiliary motor for controlling said auxiliary counterweight, and electrical interconnections between said switch mechanism and said auxiliary motor necessitating the said electrodes being held in a high resistance position by said auxiliary counterweight before said switch mechanism may be closed and providing means whereby the said auxiliary motor is energized to remove the biasing effect of said auxiliary counterweight on said electrodes when said switch mechanism is closed.

5. In combination, a driving motor, a liquid slip regulator therefor having movable electrodes for varying the resistance of the regulator, a counterweight for said electrodes of such value that the electrodes have a bias to the minimum resistance position, means operated responsively to the load on the motor for automatically varying the position of said electrodes, switch mechanism for connecting said motor to a source of supply, an auxiliary counterweight for said electrodes, and means governed by said switch mechanism for controlling said auxiliary counterweight to insure that said electrodes will be in a high resistance position before said motor is connected to the source of supply.

6. In combination, a driving motor, a liquid slip regulator therefor having movable electrodes for varying the resistance of the regulator, a counterweight for said electrodes, a torque motor operated responsively to the load on said driving motor for automatically varying the position of said electrodes, switch mechanism for connecting said driving motor to a source of supply, means governed by said switch mechanism for insuring that said electrodes will be in a high resistance position before said driving motor is connected to the source of supply, and manual controlling means for said electrodes for varying the position thereof independently of said torque motor.

In witness whereof, I have hereunto set my hand this 18th day of June, 1926.

GEORGE H. JUMP.